Jan. 23, 1968 R. O. TEEG 3,365,576
IMAGING DEVICE HAVING RESONANT CIRCUIT DISPOSED ACROSS AN
ELECTRO-LUMINESCENT LAYER AND A LAYER
OF VARYING RESISTIVITY
Filed July 1, 1964
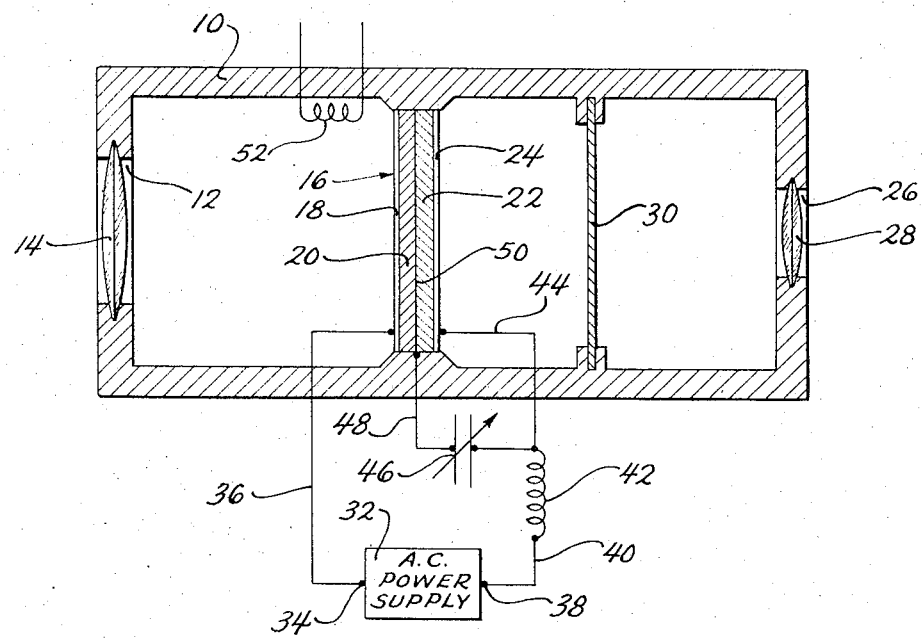
Inventor
ROBERT O. TEEG
By Bower & Patalidis
Attorneys ця
United States Patent Office 3,365,576
Patented Jan. 23, 1968

3,365,576
IMAGING DEVICE HAVING RESONANT CIRCUIT DISPOSED ACROSS AN ELECTROLUMINESCENT LAYER AND A LAYER OF VARYING RESISTIVITY
Robert O. Teeg, Grosse Pointe, Mich., assignor, by mesne assignments, to Teeg Research, Inc., Detroit, Mich., a corporation of Delaware
Filed July 1, 1964, Ser. No. 379,609
6 Claims. (Cl. 250—83.3)

ABSTRACT OF THE DISCLOSURE

An invisible radiation imaging device comprising a sensitive element, having a first layer of a material having a resistivity varying in function of its temperature and a second layer of an electroluminescent material, connected across a resonant electrical circuit. Portions of the first layer which are heated by a thermal image projected thereupon are caused to reach a temperature at which there occurs a drop of the indepth resistivity thereof which in turn causes a corresponding portion of the electrical luminescent layer to emit visible light.

---

This invention relates generally to image detectors and more particularly to invisible radiation imaging devices.

The invention has particular utility in infrared detectors or imaging devices for accurately locating and viewing an invisible hot body. Consequently, the invention is useful in connection with apparatus such as nighttime battlefield viewers, aircraft landing guidance systems, satellite or missile tracking, target acquisition, submarine tracking, spacecraft attitude control systems, to cite only a few applications. The invention is also useful in astronomy, medical testing, inspection of materials, detection of hot spots or hot elements in mechanical or electrical assemblies, etc. In its more general applications, the invention is capable of providing detectors or imaging devices for any type of radiant energy causing a temperature increase of a surface on which the energy is focused. It is, therefore, an object of the invention to provide novel invisible radiation detectors and imaging devices.

It is another object of the invention to provide radiation detectors capable of transforming an invisible image into a visible image which may be directly viewed by an observer, or which may be photographed.

It is still a further object of the invention to provide invisible radiation imaging devices which are economical to manufacture, which lend themselves to mass production techniques, which are sturdy and rugged so as to be usable in the field under adverse conditions, which are independent from any external source of power, the sensitivity of which may be easily and precisely adjusted and which may be accurately calibrated and compensated for aging of the active element.

These and other objects, advantages and features will become readily apparent from the following description taken in connection with the illustrative structural embodiment of the accompanying figure which is a simplified schematic representation of an example of an embodiment of the invention.

Referring now to the sole figure of the drawing, a typical example of an embodiment according to the present invention comprises an enclosure 10 provided with an aperture 12 in which is mounted a lens 14 adapted to focus an image of the object being examined upon an imaging cell, generally designated by numeral 16, disposed in the interior of the enclosure 10. The imaging cell 16 is preferably made of a very thin transparent electrically conductive coating 18 disposed next to the lens 14 and provided with an adhering first thin film 20 of a material having a coefficient of resisitivity varying as an inverse function of the temperature of the material. Adhering to, or in contact with, the first thin film 20 is disposed a second thin film, or substrate, 22 made of an electroluminescent material, the luminescence of which varies as a function of an alternating electrical potential applied thereacross. A second outer transparent conductive coating 24 is disposed in contact with the second thin film 22.

The enclosure 10 is provided with another aperture 26 in which is disposed a viewing or ocular lens 28. A selective screen or filter 30 may be disposed between the imaging cell 16 and the viewing lens 28 in applications where it is desired to filter out certain undesirable light frequencies or for increasing the contrast of the observed image. The interior of the enclosure 10 is preferably evacuated.

The imaging cell 16 is disposed in a series resonant electrical circuit comprising a source of alternating current 32 having a terminal 34 connected by lead 36 to the first conductive coating 18 of the imaging cell 16 and another terminal 38 connected by means of lead 40 to one end of an inductance 42. The other end of the inductance 42 is connected by means of a lead 44 to the second conductive coating 24 of the imaging cell 16. A variable capacitor 46 has one terminal connected to the second end of the inductance 42 and its other terminal connected by means of lead 48 to the junction surface 50 between the first thin film 20 and the second thin film 22.

The total capacitance of the circuit substantially consists of the capacitance of the cell 16 in parallel with the capacitance of the variable capacitor 46. The total capacitance is adjusted, previously to operation of the device, for resonance of the circuit, and variations of capacitance of the system due to aging, for example, of the materials of the imaging cell, are compensated by further adjustment of the variable capacitor.

An invisible radiation imaging device was built according to the above description wherein a $f/1$ lens 14 was used to focus an image of the target on the surface of the first thin film 20 which was made of vanadium dioxide, $VO_2$, prepared as described in copending patent application Ser. No. 358,065, filed Apr. 7, 1964. The thickness of the vanadium dioxide thin film was in the order of 1 micron, but good results have also been obtained with films having a thickness comprised between .1 micron and 10 microns. The second thin film 22 is made of a material capable of becoming luminescent when an electrical potential is applied therethrough. Such a material may be zinc sulfide ($ZnS$), gallium phosphide ($GaP$), or the like, doped with various activators such as traces of copper or chlorine. The thickness of the second thin film 22 is of the same order as the thickness of the first film 20. The conductive coatings 18 and 24 consisted of very thin transparent coatings of a metal such as gold. A power supply 32 capable of giving a 10 mv. potential at a frequency of 20 kc. was utilized with an inductance 42 of $10^{-3}$ henry and a variable capacitor 46 adjustable between 0 and .1 microfarad.

In operation, the capacitor 46 is adjusted until the electrical circuit is at resonance; when the circuit is at resonance, the total impedance of the circuit is substantially equal to zero, and the only resistances present in the circuit are the internal resistance of the power supply 32, which may be practically in the order of $10^{-2}$ ohms, the total circuit resistances, including conductor resistance, the resistance of the inductance 42, and the contact resistances, which may be kept with care in selection of the components and in assembling the device to very low values so that the total circuit resistance is small compared to the average resistance of the thin film 20 which is generally in the order of .1 ohm for a film area of 1 cm.² The thin film 20 is made of a material, such as vanadium dioxide, as previously mentioned, which has the property of varying its resistivity when exposed to thermal radiation in such a manner that the portions of the thin film which are exposed to a thermal radiation, i.e., on which an image of the target is focused by lens 14, experience a drop in its resistivity which may be halved as compared to the resistivity of the portions of the thin film left unexposed to the thermal radiation. A drop of the local resistivity of the material of the thin film 20 causes an increase of the voltage applied in depth across the second thin film 22. The luminescence property of the thin film 22 varies as a function of the voltage V applied therethrough substantially as $V^n$, wherein $n$ is usually in the order of 5. For this reason, fairly small changes of voltage through the electroluminescence thin film 22 cover the whole range of luminescence from full darkness to full brightness. The thermal invisible image focused upon the surface of the thin film 20 consequently results in local depth voltage variations through the electroluminescent film 22 causing the electroluminescent film to display a visible image of the invisible thermal image projected on the thin film 20. The visible image may be observed by means of ocular lens 28 and a selective screen 30 may be disposed, as previously mentioned, between the electroluminescent thin film 22 and the lens 28 so as to filter out the undesirable light frequencies, or so as to increase the contrast of the image displayed by the electroluminscent layer 22. The vanadium dioxide thin film 22 may be thermostated by a heating coil, schematically represented by numeral 52, so as to maintain the temperature of the vanadium dioxide thin film in the neighborhood of the value at which vanadium dioxide experiences its greatest change in resistivity in function of temperature, for example 65° C.

It has also been discovered that the thin film 20 may advantageously be made such as to present a plurality of lateral deep discontinuities similar to a grid lattice or a mosaic-like grating arrangement, so as to provide many individual microscopic sections thermally insulated from each other. Such an arrangement results in greatly increased temperature gradients between the portions of the film on which the thermal image is focused which experience a temperature increase and the portion of the film which remain unexposed, with an accompanying improvement in the resolution of the thermal image and consequently in the resolution of the electroluminescent image displayed by the electroluminescent film 22.

Although the present invention has been shown and described with reference to a particular embodiment, various changes and modifications will be obvious to anyone skilled in the art, and such changes and modifications are deemed to be within the spirit, scope and contemplation of the invention as claimed.

What is claimed as new is:

1. An infrared imaging device comprising a vanadium dioxide first thin film disposed in contact with an electroluminescent second thin film, a source of alternating electrical current having two terminals, one of said terminals being connected to the outer surface of said first thin film, a coil having one end connected to the other of said terminals and another end connected to the outer surface of said second thin film, a variable capacitor connected across the outer surface of said second thin film and the surface of said second thin film in contact with said first thin film, means for forming an infrared image upon said first thin film, and means for viewing the resulting electroluminescent image displayed by said second thin film.

2. The device of claim 1 wherein the first thin film has a mosaic-like grating structure.

3. An infrared imaging device comprising a first thin film of a material having a resistivity varying inversely to its temperature, a second thin film in contact with said first thin film and comprising an electroluminescent material, a source of alternating electrical current having two terminals, one of said terminals being connected to the outer surface of said first thin film, a coil having one end connected to the other of said terminals and another end connected to the outer surface of said second thin film, a variable capacitor connected across the outer surface of said second thin film and the surface of said second thin film in contact with said first thin film, means for forming an infrared image upon said first thin film, and means for viewing the resulting electroluminescent image displayed by said second thin film.

4. The device of claim 3 wherein the first thin film has a mosaic-like grating structure.

5. An invisible radiation imaging device comprising a cell having a first thin film of a material having a resistivity varying as an inverse function of its temperature in contact with a second thin film of a material capable of emitting visible light as a function of an electrical alternating voltage applied thereacross, means projecting a thermal image on said first film, a series resonant electrical circuit applying a substantially low voltage alternating current across said cell, means for ajusting said circuit to resonance to cause a voltage gradient across said second thin film which is proportional to the temperature gradient of said first thin film, and means for viewing the visible light emitted by said second thin film.

6. The device of claim 5 wherein the first thin film has a mosaic-like structure.

References Cited

UNITED STATES PATENTS

| | | | |
|---|---|---|---|
| 2,985,757 | 5/1961 | Jacobs et al. | 250—83.3 |
| 3,015,034 | 12/1961 | Hanlet | 250—211 |
| 3,019,345 | 1/1962 | Nisbet | 250—213 |
| 3,244,891 | 4/1966 | Orthuber | 250—213 |

RALPH G. NILSON, *Primary Examiner.*

ARCHIE R. BORCHELT, *Examiner.*

S. ELBAUM, *Assistant Examiner.*